R. A. LUPTON.
PARCEL POST SCALE.
APPLICATION FILED APR. 18, 1913.
1,095,735.
Patented May 5, 1914.
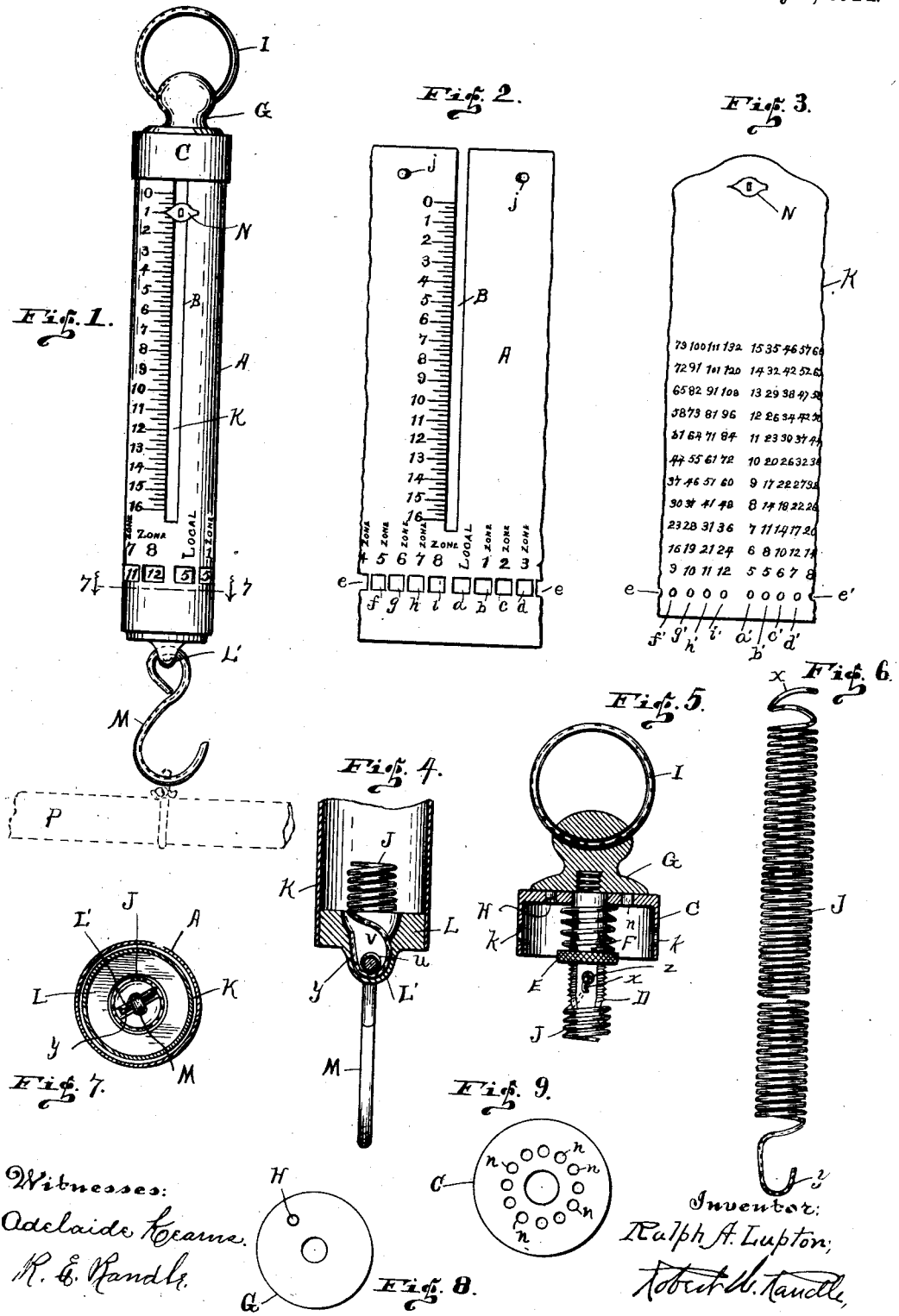

UNITED STATES PATENT OFFICE.

RALPH A. LUPTON, OF PENNVILLE, INDIANA.

PARCEL-POST SCALE.

1,095,735.  Specification of Letters Patent.  Patented May 5, 1914.

Application filed April 18, 1913. Serial No. 761,864.

*To all whom it may concern:*

Be it known that I, RALPH A. LUPTON, a citizen of the United States, residing at Pennville, in the county of Jay, and in the State of Indiana, have invented a new and useful Construction in Parcel-Post Scales, of which the following is a full, clear, and comprehensive specification, being such as will enable others to make and use the same with absolute exactitude.

The object of my present invention, broadly speaking, is to provide a hand-scale for ordinary or for postal weighing, which will be strong and durable in construction, neat and attractive in appearance, which will occupy a minimum amount of space, which will be easy to manipulate and accurate in calculation, dependable as to the results indicated thereby, easily and quickly adjusted, and which can be manufactured at a comparatively low price.

More specifically stated, my object is to provide a scale for family or individual use, but particularly intended for weighing and for computing the postage required on matter to be transmitted by parcel post.

My scale is intended primarily for use by rural route carriers, and for the patrons of such routes, and in fact for all persons who employ the parcel post in the transmission of packages, by which one may instantly determine the postage required upon a package, requiring only that the user know the postal zone in which the package is to be delivered, thereby dispensing with the usual calculation which is required with an ordinary scale to determine the result.

The invention may also be used in offices, or elsewhere, to obtain the results indicated above, and it may also be used as an ordinary weighing scale up to the limit of its capacity.

Other objects and particular advantages of my invention will suggest themselves in the course of the following specification, and the invention proper will be correlated in the appended claim.

The preferred manner for carrying out the principles of my invention, and that which in practice I have determined to be the most practical, is shown in the accompanying drawings, in which—

Figure 1 shows a front elevation of my invention assembled and as in actual practice. Fig. 2 is a plan view of the outer casing opened out. Fig. 3 is a plan view of the inner tube opened out. Fig. 4 is an enlarged detail central vertical section of the lower portion of the inner tube and parts connected thereto. Fig. 5 is an enlarged detail vertical section taken centrally through the upper portion of the mechanism. Fig. 6 is an elevation of the helical main spring alone. Fig. 7 is a cross section of the assembled device as taken, for instance, on line 7—7 of Fig. 1, and in the direction indicated by the arrow on said line. Fig. 8 is a plan view of the under face of the head. And Fig. 9 is a plan view of the upper face of the cap.

Similar indices denote like parts throughout the several views of the one sheet of drawings.

In order that the operation and the advantages of my invention may be more clearly understood and appreciated I will now take up a detailed description thereof, in which I will set forth the invention as fully and as comprehensively as I may.

The body of my construction comprises the outer casing A. Formed through the wall of said casing, and extending longitudinally from the upper end to the lower portion of said casing, is a slot B which terminates some distance above the lower end of the casing, substantially as indicated in Figs. 1 and 2.

Located vertically on the face of casing A, parallel with and adjoining said slot, is a series of graduated marks: 0, 1, 2, 3, 4, 5, 6, 7, 8, 9, 10, 11, 12, 13, 14, 15 and 16, each denoting one pound, with minor marks therebetween denoting half-pounds and quarter pounds, these may be further subdivided to indicate ounces or other fractions, said indication marks and the characters "0" to "16", inclusive, are permanently attached on or impressed in the face of the casing as shown, or a less or a greater number of said marks and numerals may be employed if desired, or their characters may be used in place of those shown.

Formed through the wall of the casing A, at right-angles to the slot B, and located around the casing near the lower end thereof, is a plurality of sight-apertures: *a*, *b*, *c*, *d*, *e*, *f*, *g*, *h* and *i*, as indicated in Fig. 2. Shown on the face of the casing A above (or below) each of said apertures is the indicating or zone name of the aperture therebelow, as "Local", "Zone 1", "Zone 2", "Zone 3", "Zone 4", "Zone 5", "Zone 6", "Zone 7" and "Zone 8", respectively, and other apertures and indicating names therefor may be employed, but those shown comply with present parcel post law.

Rigidly secured on and covering the upper end of the casing A is the cap C, which may be secured to the casing by the rivets *j—j* shown in Fig. 2, which project into suitable apertures *k* in the cap C. Formed centrally through the top of the cap C is the comparatively large aperture *m*, Fig. 9, and located concentrically therearound is a plurality of small apertures *n*, as shown in said view.

Letter D denotes a short stem which is adapted to slide up and down in said aperture *n*, said stem has a reduced threaded upper projection extending above the face of the cap C. The periphery of the body of said stem is threaded, and it is slightly flattened on two opposite sides. Threaded on the body portion of the stem D is the adjusting nut E. Encircling the body of the stem D is the minor helical spring F which is seated at one end against the under face of the cap C, with its other end seated against said nut E.

Letter G denotes the head, whose lower face is adapted to contact with the upper face of the cap C. A central threaded socket extends up into said head, in which is threaded the upper reduced portion of the stem D. Projecting down from the under face of the head G is a lug H, which is adapted to fit into either one of the small apertures *n*, as shown in Fig. 5. Carried by the head G is the ring I, by which the device may be suspended.

Letter J denotes the main spring, which terminates at its upper end in the horizontal hook *x*, and at its lower end in the vertical hook *y*. The upper portion of the spring J surrounds the lower projection of the stem D, with the hook *x* secured in the aperture *z* formed through body of the stem D as indicated in Fig. 5.

Letter K designates the inner tube, which is only slightly less in length and in diameter than is the casing A in which it is adapted to nearly fit, being adapted to slide up and down therein. Secured in the lower end of tube K is the plug L, shown in Fig. 4, which has a central downwardly projecting ear L' with a horizontal aperture *u* therethrough in which is secured the eye of the hook M. A cavity *v* is formed in the center of the plug L to receive the lower end of the spring J, said cavity opens downward in said aperture *u*, there being a groove in the base of said cavity around the inside of the ear L' at right angles to aperture *u*, thereby forming a seat for the hook *y*, as shown in Fig. 4, where said hook *y* is secured by the eye of the hook M, as shown in said view.

Projecting out from the face of the upper portion of the tube K is the pointer N, which projects through the slot B, and it is adapted to travel over the graduated marks "0" to "16" as the tube K moves up and down in the casing A.

Formed around on the periphery of the tube K are a plurality of vertical columns of figures: $a'$, $b'$, $c'$, $d'$, $e'$, $f'$, $g'$, $h'$ and $i'$, there being one of such columns for each of the apertures *a* to *i*, inclusive, through which apertures the figures in said columns may be displayed. Said figures are also arranged in horizontal rows spaced apart the same distance as are the figures 1 to 16. Each of said columns of figures consists of twelve characters denoting the parcel post rate per pound for the particular zone that column represents.

*Modus operandi:* Suppose now that the device be assembled as in Fig. 1, the main spring should be adjusted so that the pointer N will normally point to "0" on the face of casing A, this may be accomplished by grasping the device in one hand below the cap C and with the other hand pull upward on the ring I, against the resiliency of the spring F, thereby removing the lug H from one of the apertures *n*, then the head G may be turned to the right or the left thereby raising or lowering the stem D which will tighten or loosen the spring F, thereby raising or lowering the tube K with relation to the casing A, which of course will change the position of the pointer N with relation to the character "0", and when the lug H is finally allowed to enter one of the apertures *n* the pointer N should be opposite the character "0" at which position the ciphers only will appear in the apertures *a* to *i*. Now if a package P weighing one pound, for instance, be suspended from the hook M the pointer N should be brought down thereby opposite to the numeral "1", as shown in Fig. 1, this position of the pointer will have caused the tube K to have moved down so that the second row of numerals of the various columns on the tube K will appear through their respective apertures in the lower portion of the casing A, thus displaying to the operator the parcel post rate of one pound for any particular zone, for instance: A shows, the local rate for one pound, as shown in Fig. 1, as "5" which is understood to be five-cents; in zone 1 it would also be five-cents; the rate in zone 2 would be six cents; in zone 3 seven cents; in zone 4 eight cents; in zone 5 nine cents; in zone 6 it would be ten cents; the rate in zone 7 would be eleven cents; and the rate in zone 8 would be twelve cents. If the package should weigh a fraction more than the one pound indicated then the rate would be computed as if it weighed two pounds. Should the package weigh 11 pounds, which is the limit under the present law, then the numerals 15, 35, 46, 68, 79, 100, 111 and 132, shown at the upper ends of the several columns in Fig. 3, would be displayed through their respective apertures a, b, c, d, e, f, g, h and i, said numerals would denote the highest rates for each of the several zones. In like manner any intermediate rate may be determined, the weight of the package causing the proper rate to be displayed in the several zone apertures in which the package is to be delivered.

I desire that it be understood that I am not to be limited to the precise details of construction shown, as various changes may be made in the several details without departing from the spirit of my invention and without sacrificing any of the advantages thereof.

Having now fully shown and described my invention, and the best means for its construction to me known at this time, what I claim and desire to secure by Letters Patent, is—

A parcel post scale comprising a casing having a row of apertures therein arranged horizontally around the lower portion thereof and having a vertical slot extending from its upper end to near said apertures, an inner tube within said casing and adapted to be moved downward with its lower portion extending below the casing, a cap covering the upper end of said casing and having a central aperture and a plurality of smaller apertures therein, a stem slidable in said central aperture and having a reduced and threaded upper portion, an adjusting nut threaded on the body of said stem, a coil spring encircling said stem with its ends seated against said nut and the lower face of said cap, a head threaded on the upper end of said stem and adapted to contact with said cap, a lug extending down from the under face of the head and adapted to fit in either one of said smaller apertures in the cap, a main spring having its upper end connected to said stem and its lower end secured in the lower end of said inner tube, means carried by the head for suspending the scale, means carried by the lower end of the inner tube for suspending articles to be weighed, a pointer carried by the inner tube and extending out through said slot in the casing, there being a series of figures on the casing and adjoining said slot therein, there also being a different zone indicating mark for each of said sight apertures, there also being a vertical row of figures for each of said apertures same being carried by said inner tube and adapted to indicate the rate of the article suspended from the scale depending upon the position of the inner tube with relation to the casing, all substantially as shown and described.

In testimony whereof I have hereunto subscribed my name to this specification in the presence of two subscribing witnesses.

RALPH A. LUPTON.

Witnesses:
R. W. RANDLE,
R. E. RANDLE.

---

Copies of this patent may be obtained for five cents each, by addressing the "Commissioner of Patents, Washington, D. C."